3,077,503
PREPARATION OF O-BROMOTOLUENE
John W. Crump, Midland, Mich., assignor to The Dow Chemical Company, Midland, Mich., a corporation of Delaware
No Drawing. Filed May 2, 1960, Ser. No. 25,896
11 Claims. (Cl. 260—650)

This invention relates to a process for the preparation of o-bromotoluene; more particularly, to a process for the catalytic isomerization of p-bromotoluene to a mixture containing o-bromotoluene as the largest single constituent.

It is well known that Friedel-Crafts and similar catalysts can be used to effect a variety of catalytic reactions such as alkylations and isomerizations. Many reports of such isomerizations of halogenated and alkylated aromatics can be found in the literature. Typically, the reaction has been allowed to proceed until an equilibrium mixture of isomers is reached or closely approached. In cases where the concentrations of the various isomers have been followed, it has been found that these concentrations gradually increased to equilibrium values, approaching these values asymptotically. I have found that p-bromotoluene is isomerized by above-mentioned catalysts to an equilibrium mixture of isomers containing approximately 36 percent o-bromotoluene, 46 percent m-bromotoluene, and 18 percent p-bromotoluene, together with such toluene and dibromotoluenes as may be formed by disproportionation.

As a new and unexpected result of such experiments, I have found that certain catalysts, namely $AlBr_3$, $AlCl_3$, and $BF_3$ in liquid HF, when brought into contact with catalytic amounts with liquid p-bromotoluene under conditions suitable to effect isomerization, will cause a temporary rise in the concentration of the ortho isomer to a level substantially higher than that found in the equilibrium mixture and that the reaction may be stopped, ordinarily by addition of water to inactivate the catalyst, when a maximum concentration of o-bromotoluene is reached. This maximum is usually about 50 percent of the mono bromotoluenes present, substantially above the equilibrium value of 36 percent. The increased concentration of o-bromotoluene not only offers a larger yield, but also facilitates its separation from the mixture.

Various modifications may be made in the process to obtain convenient operating conditions. The concentration of catalyst directly affects the rate of isomerization, that is, an increase in catalyst concentration will increase the isomerization rate. It has been found that 0.2 to 0.3 mol percent of catalyst is necessary to get any substantial isomerization and as much as about 20 mol percent has been used successfully. Catalyst concentrations higher than 20 mol percent may be used, but for ease of operation, lower ranges are used in practice. The reaction proceeds satisfactorily at temperatures of −20 to 30° C. The rate of isomerization is also affected by other factors. Thus, the corresponding hydrogen halide may be used with $AlCl_3$ or $AlBr_3$ to accelerate the reaction, the reaction temperature may be raised or lowered to raise or lower respectively the reaction rate to a convenient level, and it has been found that addition of a small amount of a compound capable of acting as a Lewis base, that is, as an electron donor to a Lewis acid such as $AlCl_3$, will slow down the rate of isomerization. Alkylated benzenes are known to behave as Lewis bases and methylated benzene hydrocarbons are, for obvious reasons, most suitable for use with bromotoluenes. In particular, m-xylene has been found useful in lengthening reaction time. Ordinarily it is used in amounts of 1–10 mol percent based on the bromotoluene. Toluene itself has lesser activity in this connection and its main effects when present are to reduce disproportionation of the mono bromotoluenes to toluene and dibromotoluene and also to act as a diluent.

The following table of experimental results illustrates the effects of these variables on the time required to reach the maximum content of o-bromotoluene.

TABLE I

| Mol percent Catalyst | Temperature, °C. | Time to Reach Maximum Ortho, hrs. |
|---|---|---|
| 1.7 percent $AlCl_3$ | 0 | 95 |
| 5 percent $AlCl_3$ | 0 | 23 |
| 19 percent $AlCl_3$ | 0 | 5.2 |
| 0.95 percent $AlCl_3$ | 20 | 4.7 |
| 4.5 percent $AlCl_3$ | 25 | 1.5 |
| 5.2 percent $AlCl_3$+3 percent m-xylene | 25 | 3.5 |
| 0.46 percent $AlCl_3$+HCl | 0 | 1.8 |
| 0.35 percent $AlBr_3$ | 25 | 2.0 |
| 4 percent $AlBr_3$ | −20 | 8 |

Preferably I use an approximately equimolar solution of p-bromotoluene in toluene with from 1–5 mol percent $AlCl_3$ based on the p-bromotoluene and a reaction temperature of about 25° C. The mixture is stirred vigorously under a nitrogen atmosphere under substantially atmospheric pressure. When infrared analysis shows that a 2/1 ratio of o-bromotoluene to p-bromotoluene exists, the reaction is stopped by adding water and, if desired, the o-bromotoluene is then separated from the reaction mixture by conventional means. The existence of a 2/1 ratio of o-bromotoluene to p-bromotoluene has been found to be a good indication that the maximum ortho concentration has been reached. The reaction time required under the above conditions is approximately 1–5 hours. For ease of operation, the reaction time is preferably at least 1.5 hrs.

The following examples will serve to illustrate some ways in which my process may be carried out:

*Example 1*

A solution of 0.225 mol p-bromotoluene in 0.225 mol toluene was stirred at 25° C. with 0.0023 mol $AlCl_3$ under a nitrogen atmosphere. Samples were removed periodically and the composition of the monobromotoluenes was estimated by means of infrared spectra. The data are given in Table 2.

TABLE 2

| Reaction Time, Hrs. | Composition of Bromotoluenes | | |
|---|---|---|---|
| | Percent Ortho | Percent Para | Percent Meta |
| 0 | 0 | 100 | 0 |
| 0.5 | 15.3 | 79.5 | 3.9 |
| 1 | 32.4 | 54.4 | 13.3 |
| 1.75 | 44.7 | 35.3 | 20.1 |
| 2.4 | 46.9 | 27.1 | 26.1 |
| 3.6 | 46.0 | 23.4 | 30.7 |
| 4.6 | 44.7 | 21.0 | 31.7 |
| 6.5 | 43.2 | 20.9 | 36.0 |
| 24.5 | 39.9 | 18.9 | 41.4 |

*Example 2*

A mixture of toluene, p-bromotoluene, and $AlCl_3$ in a molar ratio of 1.1:1.0:0.05 was stirred at 0° C. under nitrogen. The composition of the monobromotoluenes was estimated periodically as in Example 1 and the results are shown in Table 3.

TABLE 3

| Reaction Time, Hrs. | Composition of Bromotoluenes | | |
|---|---|---|---|
| | Percent Ortho | Percent Para | Percent Meta |
| 0 | 0 | 100 | 0 |
| 2.75 | 23.1 | 70.7 | 6.2 |
| 6.2 | 38.7 | 49.9 | 11.4 |
| 10.1 | 44.6 | 40.6 | 14.7 |
| 15.7 | 50.4 | 31.9 | 17.7 |
| 23 | 51.5 | 27.8 | 20.8 |

*Example 3*

A mixture of 0.827 mol p-bromotoluene, 0.849 mol toluene, and 0.0079 mol AlCl₃ was stirred at about 20° C. under a nitrogen atmosphere. Samples were removed periodically and analyzed by means of infrared spectra. At a point where infrared analysis showed the composition of the monobromotoluenes to be 45.4 percent ortho, 32.3 percent meta, and 22.3 percent para, the mixture was poured into icewater, the layers were separated, and the aqueous layer was extracted with two 25 cc. portions of methylene chloride. After drying over anhydrous MgSO₄, the combined organic layers were distilled to give 0.802 mol toluene (96 percent recovery¹) and 0.762 mol monobromotoluenes (94 percent recovery¹). Infrared analysis of the monobromotoluene fraction indicated 48.2 percent ortho, 30.2 percent meta, and 21.6 percent para.

*Example 4*

A mixture of 0.15 mol toluene and 0.15 mol p-bromotoluene was stirred at 25° C. with 0.0002 mol AlBr₃ under a nitrogen atmosphere. No reaction took place in one hour. Additional AlBr₃ was added to make a total of 0.00053 mol and stirring was continued at 25° C. Samples were removed periodically and the monobromotolu-

TABLE 4

| Reaction Time, Minutes | Composition of Bromotoluenes | | |
|---|---|---|---|
| | Percent Ortho | Percent Para | Percent Meta |
| 35 | 35 | 48 | 17 |
| 55 | 43 | 35 | 22 |
| 70 | 45 | 30 | 24 |
| 85 | 47 | 28 | 25 |
| 115 | 47 | 24 | 29 | ene composition was estimated by means of infrared spectra. The results are tabulated in Table 4.

¹ Based on amount of reaction mixture remaining after removing 4.2 g. for analysis.

I claim:
1. A process for catalytic isomerization of p-bromotoluene to isomeric bromotoluenes containing substantially more than 36 percent of o-bromotoluene, which process comprises bringing liquid p-bromotoluene into contact with a catalytic amount of a halide selected from the group consisting of AlCl₃, AlBr₃, and BF₃ in liquid HF at a temperature at which isomerization occurs for a reaction time sufficient for the o-bromotoluene content substantially to exceed 36 percent of the monobromotoluenes present.

2. A process as described in claim 1 in which the halide is AlBr₃.

3. A process as described in claim 1 in which the halide is AlCl₃.

4. A process as described in claim 1 in which the halide is BF₃ in liquid HF.

5. A process as described in claim 1 in which the halide is used in conjunction with the corresponding hydrogen halide.

6. A process as described in claim 1 in which the halide is present in 0.3 to 20 mol percent based on the bromotoluenes.

7. A process as described in claim 1 in which the p-bromotoluene contains a methylated benzene hydrocarbon.

8. The process of claim 7 in which the methylated benzene hydrocarbon is toluene.

9. The process of claim 7 in which the methylated benzene hydrocarbon is m-xylene.

10. A process as described in claim 1 in which the reaction temperature is in the range −20° C. to 30° C.

11. A process for making o-bromotoluene which comprises bringing an approximately equimolar solution of p-bromotoluene in toluene into contact with from 1–5 mol percent of AlCl₃ based on the p-bromotoluene at a temperature of 0°–30° C. and stopping the reaction when the proportion of o-bromotoluene in the total monobromotoluenes is substantially more than 36 percent.

References Cited in the file of this patent
UNITED STATES PATENTS 2,727,075 Mattano _____ Dec. 13, 1955
2,920,109 Angelkorte _____ Jan. 5, 1960

OTHER REFERENCES

Van der Lann: "Chemisches Zentralblatt," vol. 77 (1906), pages 661–2.

"The Rearrangements of Certain Derivatives of Toluene by the Action of Aluminum Chloride," by J. F. Norris et al., J. Am. Chem. Soc., 61, 2128–3 (1939).